United States Patent
Moran et al.

(10) Patent No.: US 11,231,878 B2
(45) Date of Patent: Jan. 25, 2022

(54) CONTENT MODIFICATION CONTROL

(71) Applicant: Arm IP Limited, Cambridge (GB)

(72) Inventors: Brendan James Moran, Histon (GB); Jean-Luc Claude Robert Giraud, Melbourn (GB)

(73) Assignee: ARM IP LIMITED, Cambridge (GB)

( * ) Notice: Subject to any disclaimer, the term of this patent is extended or adjusted under 35 U.S.C. 154(b) by 35 days.

(21) Appl. No.: 16/670,013

(22) Filed: Oct. 31, 2019

(65) Prior Publication Data
US 2021/0132859 A1    May 6, 2021

(51) Int. Cl.
*G06F 3/06* (2006.01)
*G06F 9/46* (2006.01)

(52) U.S. Cl.
CPC .......... *G06F 3/0659* (2013.01); *G06F 3/0604* (2013.01); *G06F 3/064* (2013.01); *G06F 3/0652* (2013.01); *G06F 3/0679* (2013.01); *G06F 9/467* (2013.01)

(58) Field of Classification Search
CPC .......... G06F 11/1433; G06F 8/65–658; G06F 3/0659; G06F 3/0652; G06F 3/0679; G06F 3/0604; G06F 9/467; G06F 3/064–0658
See application file for complete search history.

(56) References Cited

U.S. PATENT DOCUMENTS

| | | | | |
|---|---|---|---|---|
| 8,196,130 | B2* | 6/2012 | Chen | G06F 11/1433 717/168 |
| 2004/0062130 | A1* | 4/2004 | Chiang | G06F 8/658 365/230.03 |
| 2011/0099627 | A1* | 4/2011 | Proudler | G06F 21/57 726/21 |
| 2015/0067232 | A1* | 3/2015 | Fontana | G06F 12/0253 711/103 |

FOREIGN PATENT DOCUMENTS

JP    2012190075 A    * 10/2012

OTHER PUBLICATIONS

Wikipedia, "Cryptographic hash function", Sep. 26, 2019, Internet Archive, Snapshot preserved on Sep. 26, 2019, pp. 1-12 https://web.archive.org/web/20190926024406/https://en.wikipedia.org/wiki/Cryptographic_hash_function (Year: 2019).*

* cited by examiner

*Primary Examiner* — Reginald G Bragdon
*Assistant Examiner* — Curtis James Kortman
(74) *Attorney, Agent, or Firm* — Patterson Thuente Pedersen, P.A.

(57) ABSTRACT

A machine-implemented method for transactional modification of content in solid state storage, comprising receiving a delta data structure comprising at least one delta targeting at least one data block; copying a first data block targeted by the at least one delta from the first data block's home location into a non-volatile store; first modifying a first flag (Continued)

of a plurality of flags stored in the delta data structure following copying of the first data block; reading the first data block into memory; modifying the first data block in memory according to the delta to produce a ready-to-write data block; erasing a target location to create an empty block; writing the ready-to-write data block to the target location; and recording in the delta data structure that the first data block has been modified.

12 Claims, 3 Drawing Sheets

CONTENT MODIFICATION CONTROL

The present technology is directed to controlling the application of modifications to content on electronic devices, especially in situations when failures, such as power failures, may interrupt modification operations.

In the past, information processing environments were typically isolated from the "real world" by physical barriers and lack of electronic connections, and were typically under the control of dedicated professionals with detailed knowledge of system operation, data integrity and system security. Such installations were once kept behind locked doors and tended by trained operators and system programmers; they were often only accessible from dedicated terminal devices which were themselves often kept in secure areas of a plant or office. Updates to data content (including executables, such as software and firmware) were usually conducted by selected professionals who understood how the systems operated at a level of detail, and any changes were often subject to checks and balances such as "buddy-checking" and sometimes long periods of testing and parallel operation to ensure that the correct functioning of the systems was maintained.

In recent years, by contrast, more and more devices are becoming networked and provided with local processing capability; these devices are typically under the control of people without any particular training in system operation and integrity. Very recently, devices from home computers to vehicles and light bulbs have begun to acquire these additional functions and to be connected together through the Internet of Things (IoT). With this massive proliferation of networked devices, initially loading and later making any changes presents increasingly complex difficulties. For example, such devices are not shipped in the way that conventional data processing devices have been shipped in the past—because they are increasingly treated as mere commodities, they may be held in stock at warehouses and retail outlets for some time before being sold and installed by the ultimate user. This delay may mean that content is out of date from the start, and needs to be updated before the device is made operational. These "commissioning" updates and any later updates will typically be made by users with no particular understanding of system operations and no knowledge of how to deal with any problems that may arise. Thus, the conventional means of dealing with modifications to any data content on the devices, such as firmware, are no longer adequate, and the integrity and functionality of the device at its point of use may easily become compromised by any failures that might occur during the content modification process.

In an approach to the many difficulties encountered in controlling the application of modifications to content on electronic devices, the present technology provides a machine-implemented method for transactional modification of content in solid state storage, comprising receiving a delta data structure comprising at least one delta targeting at least one data block; copying a first data block targeted by the at least one delta from the first data block's home location into a non-volatile store; first modifying a first flag of a plurality of flags stored in the delta data structure following copying of the first data block; reading the first data block into memory; modifying the first data block in memory according to the delta to produce a ready-to-write data block; erasing a target location to create an empty block; second modifying a second flag of the plurality of flags stored in the delta data structure following the modifying of the first data block and the erasing of the target location; writing the ready-to-write data block to the target location; and recording in the delta data structure that the first data block has been modified.

In a hardware approach, there is provided an electronic apparatus comprising logic elements operable to implement the methods of the present technology. In another approach, the computer-implemented method may be realised in the form of a computer program operable to cause a computer system to perform the process of the present technology.

Implementations of the disclosed technology will now be described, by way of example only, with reference to the accompanying drawings, in which.

Content that is to be applied to a device may comprise data or executable instructions and may be encoded in various ways. In one implementation, content may comprise data encoded in a machine-readable format, and it may comprise data encoded together with structure entities that define the structure to be imposed on the data. Other content may be distributed in other formats that may be more convenient, for example, formats that use less bandwidth over the signal medium.

In one example, a modification to previously stored data on the device may be distributed to receivers in the form of transform instructions, so that specified locations in the pre-existing data at the receiver may be modified according to the transform instructions. In another example, which may be termed "differential update", content in the form of a delta data structure, such as a delta file, may be distributed to receivers, so that receivers can add new data or replace pre-existing data with changed data according to embedded instructions in the delta file. In this way, only the differences, or means of achieving modification according to such differences, need to be transmitted over the communications medium in the form of a delta data structure. The bandwidth occupied by the content is thus significantly less than if a whole new image of the content were to be transmitted. This difference may be significant when, for example, the content is device firmware, which is typically rather large, and where bandwidth is limited, or where power limitations apply.

When a differential update is required, it is transmitted to, and received by, the device. After receipt at the device, the one or more deltas are stored. To apply the deltas, the device reboots. The bootloader takes the delta data structure that represents the differential update and applies it, normally by applying modifications to the contents of the solid-state storage (such as Flash memory) on the device.

A significant difficulty arises if power fails during application of a differential update—if this happens, the bootloader must rerun the application of the deltas from the delta data structure. If the differential update is being performed in place, it may not be possible to recover from the failure, since the bootloader may not know what has been changed, and thus the modification may be left in a state of partial completion. If this happens, and if the bootloader is sufficiently sophisticated to detect the problem and handle it, the entire set of content may need to be downloaded and installed on the device. Where devices are powered, as many now are, using less-stable means of acquiring power, such as power harvesting, failures of this type may be repeated, causing repeated and wasteful attempts to update the content of devices.

According to the present technology, the content of a device's solid-state storage can be modified in such a way as to render it transactional—that is, so that it complies with the set of requirements known by the acronym ACID. The acronym stands for the concepts Atomicity, Consistency, Isolation, and Durability. Atomicity means that changes to data are either done as a whole or not at all. Consistency means that the changes to the data do not leave conflicting settings. Isolation means that there are no "leaks" from the changes to the intended target data that inadvertently affect other, unrelated data or processes. Durability means that the changes persist after the operation is complete—they are not left with any settings that will cause them to be reversed out in the future.

A device according to the present technology receives a differential update in the form of a delta data structure. The device can then authenticate the delta data structure using some authentication means, such as a digital signature, and can then end the process if the authentication is not positive. Once the device has a usable delta data structure, it copies a target data block of a delta into a non-volatile store and modifies a first flag to indicate the stage of the proceedings that has been reached. The device then reads the block into working memory, where it is modified according to the delta data structure and held ready to write. The device then erases the block's target write location in the solid-state storage, and may modify a second flag to indicate the stage of the proceedings that has been reached. In one variant, the stage may be determined simply by checking that the target block is empty, thereby reducing the number of flag manipulations.

The modified data block held in working memory is then written to a target location (which may be the block's home location with its original contents erased), and an indication is left to indicate that the delta for the target block has been completed.

There are two possible orderings of the above process, either of which may be used—the first is:
1) Copy data into scratch-pad
2) Set flag
3) Copy data into RAM
4) Modify data in RAM
5) Erase target
6) Set flag (optional as described above)
7) Write target
8) Complete The second is:
1) Copy data into RAM
2) Modify data in RAM
3) Write data into scratch-pad
4) Set flag
5) Erase target
6) Set flag (optional as described above)
7) Write target
8) Complete In this way, at each significant stage of the process, a flag may be used to indicate the progress of the delta for the particular block. If a failure, such as a power failure, interrupts the process, the bootloader can test for a completion record for the delta targeting a particular block, and if none is found, can examine the state of the flags to determine where the process should be resumed and what action needs to be taken next. If a completion record for the block is found, the delta is treated as a no-operation, and if there are further deltas in the delta data structure, they can in turn be processed.

Figure 1:
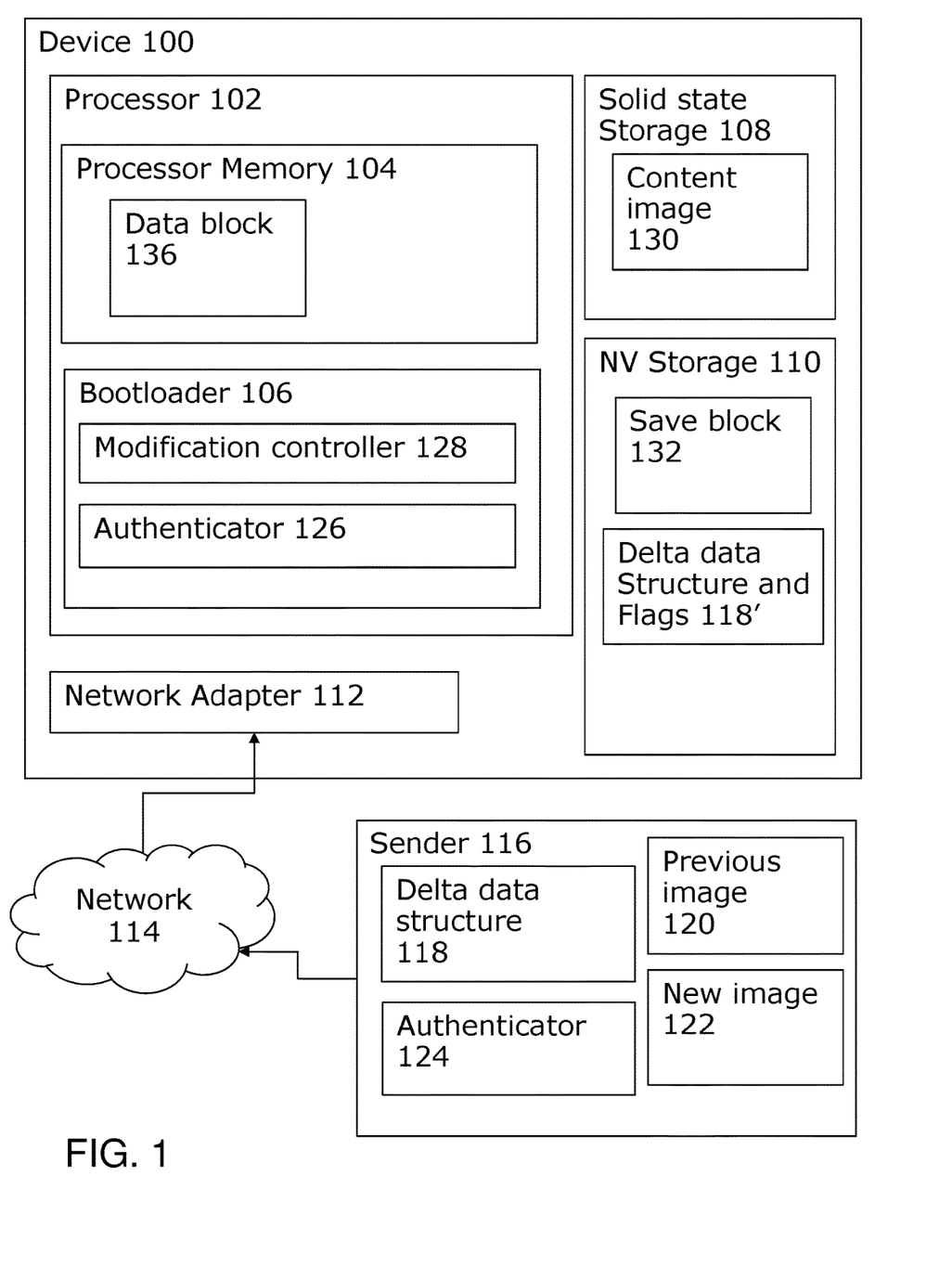
FIG. 1 shows an example block diagram of a deployment of a computer-implemented embodiment of the present technology comprising hardware, firmware, software or hybrid components.

Referring to FIG. 1, an example of a deployment of a computer-implemented embodiment of the present technology is shown. Device 100 is shown in FIG. 1 as being operably connected over a network 114 with at least sender 116, but is also operational with numerous other general purpose or special purpose computing system environments or configurations. Examples of well-known computing processing systems, environments, and/or configurations that may be suitable for use with device 100 include, but are not limited to, gateways, routers, personal computer systems, server computer systems, thin clients, thick clients, handheld or laptop devices, multiprocessor systems, microprocessor-based systems, set top boxes, programmable consumer electronics (smartphones, smart watches, tablets), network PCs, minicomputer systems, mainframe computer systems, and distributed computing environments that include any of the above systems or devices.

Device 100 and sender 116 may be described in the general context of computer systems and computer systems on a chip (SoC). Such computer systems may comprise logic by which executable instructions, such as program modules, are executed by a computer processor. Generally, program modules may include: routines; programs; objects; components; logic; and data structures that perform tasks or implement abstract data types.

As described above, device 100 is connected through a network 114 connection, which may comprise a wide area network (WAN) to sender 116. Any other type of network can be used including a low power wireless network, but in many embodiments network 114 is typically a wired network such as the Internet. In one embodiment, network 114 may comprise a cloud computing environment.

Device 100 comprises: processor 102; network adapter 112; solid-state storage 108 and non-volatile (NV) storage 110. Non-volatile storage may be in the form of any of the well-known non-volatile storage technologies, such as Flash memory, EEPROM, magnetic storage, optical storage, optoelectrical storage or the like.

Processor 102 is for loading machine instructions and for performing machine operations in response to the machine instructions. Such machine operations include: performing an operation on a value in a register (for example arithmetical or logical operations); moving a value from a register to a memory location directly and vice versa; and conditional or non-conditional branching. A typical processor can perform many different machine operations. The machine instructions are written in a machine code language which is referred to as a low-level computer language. A computer program written in a high-level computer language (also known as source code) needs to be compiled to a machine code program (also known as object code) before it can be executed by the processor. Alternatively, a machine code program such as a virtual machine or an interpreter can interpret a high-level language (such as C) in terms of machine operations. Processor 102 is for processing instructions and comprises: fetch circuitry for fetching instructions; decode circuitry for decoding instructions; and execution circuitry for executing instructions (not shown). Data and program code stored in processor memory 104 are accessible to processor 102, including, for example, data block 136. Processor memory 104 may comprise a scratchpad memory for temporary storage of data, such as data block 136, that is being manipulated by instructions executed by processor 102.

Network adapter 114 is for enabling communication between Device 100 and other network devices.

Processor 102 comprises: processor memory 104, which may be operable to act as a working store for operating upon, for example, data block 136. Processor 102 further comprises bootloader 106, which may be operable in cooperation with solid state storage 108, NV storage 110 and processor memory 104 to perform data operations implementing methods according to various embodiments of the present technology to update the content image 130 in solid state storage 108 in accordance with the delta data structure and flags 118'. Bootloader 106 comprises an authenticator, operable as required to authenticate input data received, for example, by network adapter 112 over network 114, and modification controller 128, operable to modify content image 130. Non-volatile (NV) storage 110 may comprise at any time one or more save blocks 132 corresponding to data blocks 136 and delta data structure and flags 118' stored after being received from sender 116, where delta data structure 118 has been derived by means of a differencing procedure between previous image 120 and new image 122.

In implementations, the present technology provides a way for each stage of the modification process to be made transactional, using a counter or a plurality of flag bits held in the delta data structure 118' to keep track of and indicate which stage of the differential update has been processed. The counter or flag is only modified after each fragment has been processed. Then, in the event of an interruption and restart, the bootloader 106 can detect the stage reached, and can respond by restarting the process at the appropriate stage, or, if it finds an indication that all stages of update for any particular block have been completed, it can treat the relevant command in the delta data structure as a no-operation. In this way, interruptions of the update process may be mitigated so as to bring content image 130 into conformity with new image 122 on completion of the process.

Figure 2:
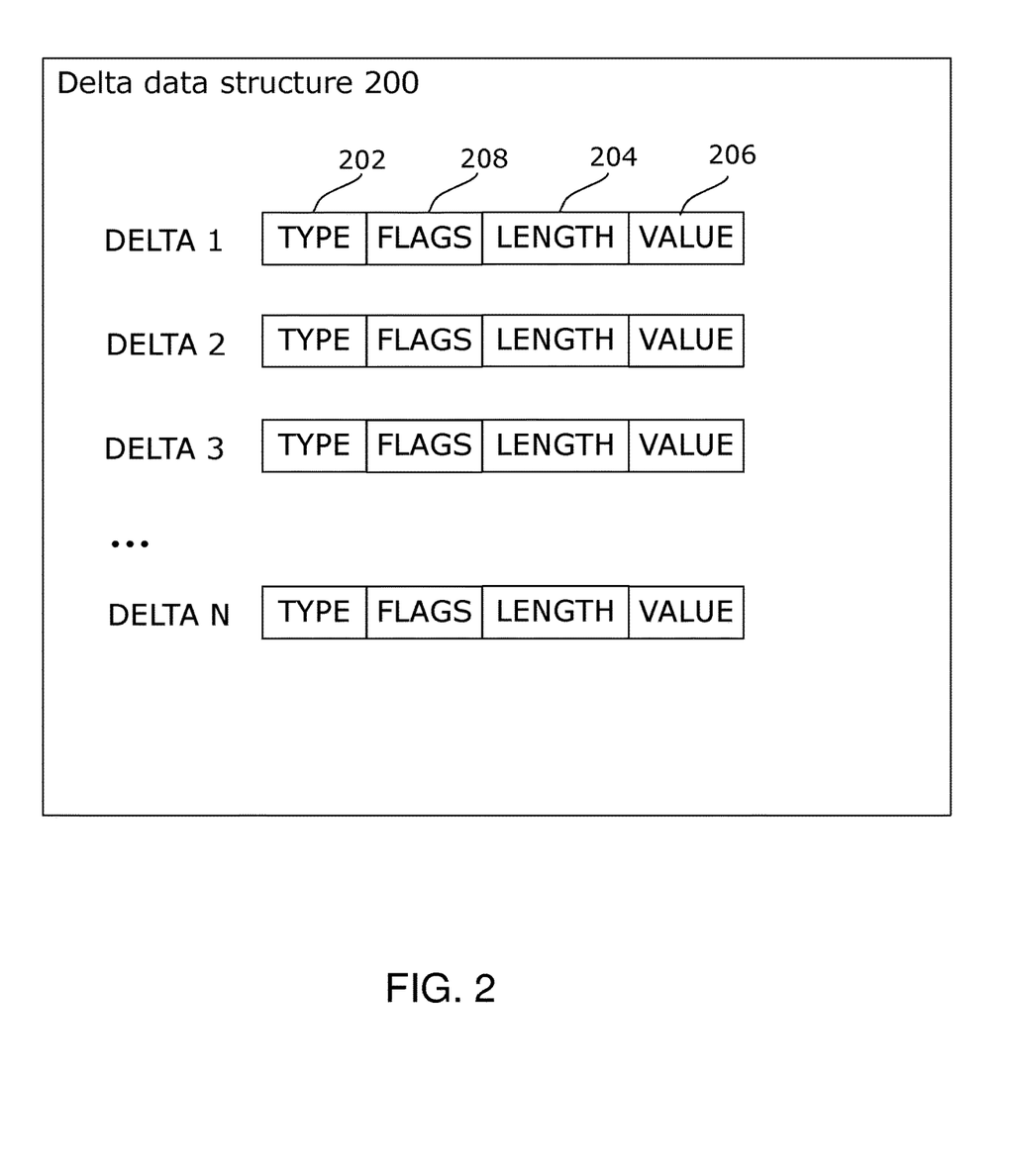
FIG. 2 shows a portion of a data structure by means of which an embodiment of the presently described technology may be implemented.

In one possible implementation, a delta data structure 200 comprising modifiable deltas (DELTA 1, DELTA 2, . . . DELTA N) may be constructed as shown in FIG. 2. The basic delta command structure for modifying the device content can be constructed using three elements: Type 202, Length 204, and Value 206. These three elements are sufficient to enable the bootloader to identify the action to be taken for a block of content, the length of the data to be acted upon and the data value to be used to perform the action. The delta commands that enable updates to be performed comprise:

INSERT which inserts a new data value;

COPY, which copies data from one location to another; and

DIFFERENCE, which applies a differencing algorithm to the original and the command's Value parameter and writes the result.

In one embodiment, a new Type may be added: NO-OPERATION (NOP). An explicit NOP tells the bootloader's modification controller to perform no processing for the block. The bootloader's modification controller responds by passing either to the next block, if one exists, or by completing its processing.

In one possible example of a delta data structure according to the present technology, individual commands are referred to as deltas (each comprising at least a command Type, a data Length, and a block-sized data Value). On a device, Flash memory is written in "sectors" which are aligned with the hardware write sector. In an embodiment, the blocks of content data that are operated on using the delta commands are aligned with write sectors. As will be clear to one of skill in the art, other arrangements and sizes of data are equally valid.

FIG. 2 thus shows a portion of a data structure by means of which an embodiment of the presently described technology may be implemented. In addition to the Type, Length and Value fields of each delta (DELTA 1, DELTA 2, . . . DELTA N) in the delta data structure, an implementation of the present technology also includes a Flags field 208. Flags field 208 can, in this implementation, contain a plurality of bits, the settings of which can be used to indicate the stage that has been reached in the update for that block, and by extension, the complete differential update. Flags 208 has been shown as a separate field in the figure, but it could also be implemented in a more space-efficient manner, as there are so few Type settings available—this means that a byte (such as an octet) could be shared between the Type settings and the Flags, thereby further saving space in the differential update delta data structure that is to be transmitted over the network.

Taking one specific implementation as a working example, a delta in the delta data structure that targets a block can be encoded as follows. The first 3 bits may indicate the delta command Type, thus:

INSERT=0x7
COPY=0x6
DIFFERENCE=0x5

The remaining 5 bits are then available for the Flags that act as a status counter for the delta command, which could be encoded thus, using 3 of the 4 most significant bits (numbering bits from 0):

Unexecuted=0x1F
Write buffer cached=0x1E
Sector erased=0x1C
Command Done=0x00

In this exemplary implementation, because each step forward for Flags status indicator modifies a 1-bit to a 0-bit, the progression through the stages from Unexecuted to Command Done is possible on certain types of Flash memory without the requirement for an erase cycle for each change. (Of course, as will be clear to one of skill in the art, this logic may need to be inverted depending on the storage technology used to implement the present technology.)

Figure 3:
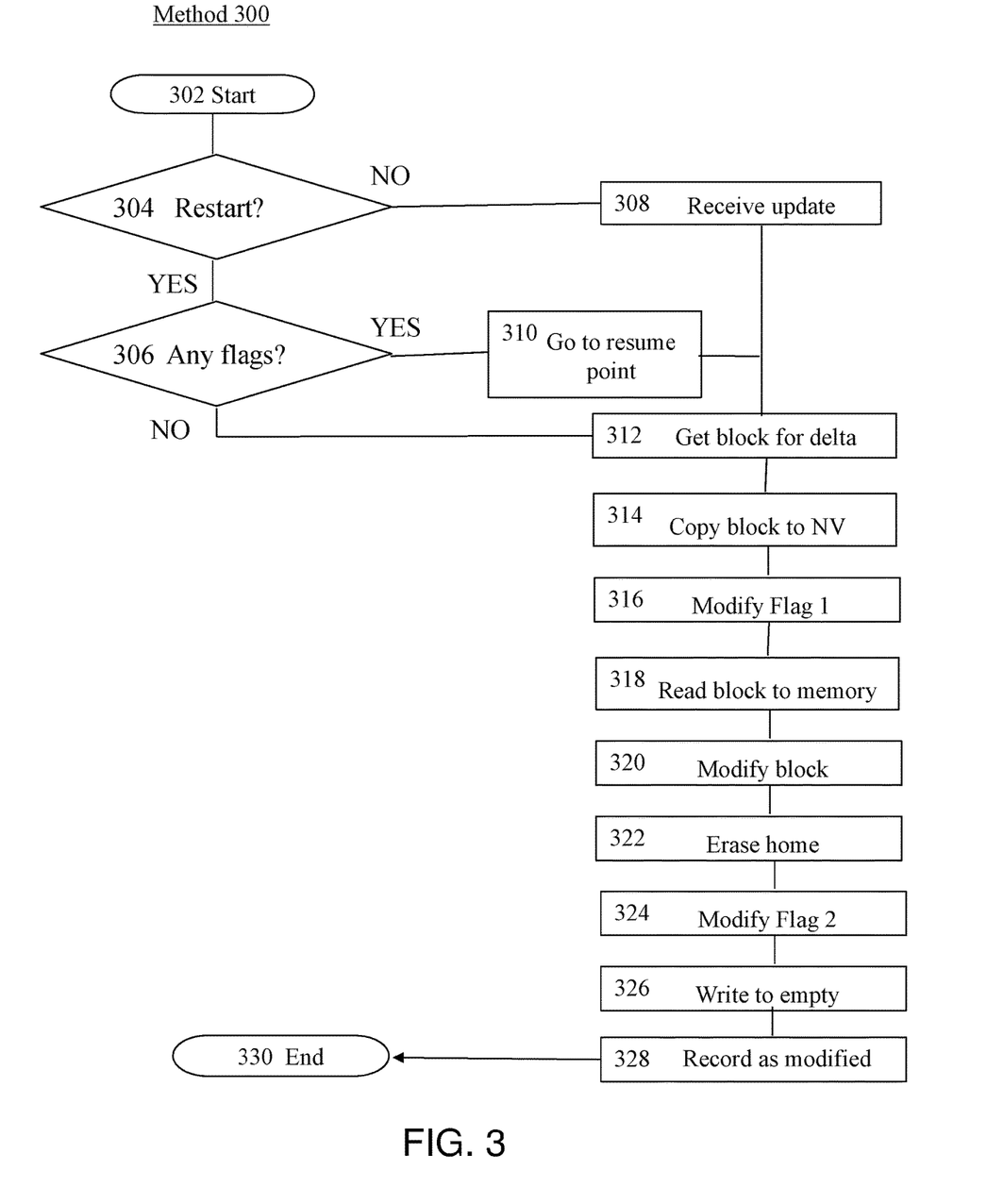
FIG. 3 shows a method of operation by means of which an embodiment of the presently described technology may be implemented.

Turning now to FIG. 3, there is shown a method 300 of operation of a device comprising solid state storage by means of which an embodiment of the presently described technology may be implemented. The method 300 begins at Start 302, and at 304, the device state is tested to see if it has been restarted (for example, after a failure, such as a power failure). If this is not a restart, the device moves to 308, where it is operable to access any updates that have been sent to it. The process from 308 when updates have been accessed will be described further below.

If this is a restart, a further test is performed at 306 to determine the existence of flags in the delta data structure. If flags exist, they are examined to determine the point in the interrupted update process where the update is to be resumed, and at 310, processing is advanced to the resume point.

If there are no flags in the delta data structure, and an update has been received at 308, the device accesses the first (or next) required block for the current delta in the delta data structure at 312. At 314, the block is copied to the non-volatile store so that a saved copy of the unmodified block is kept available during the remainder of the process, even if there is a subsequent power failure.

At 316, a first flag out of a plurality of flags is modified to indicate the stage that the update has reached. That is, the first flag is modified to indicate that the unmodified target block has been successfully saved into the non-volatile store. If the device's bootloader finds that this is the flag setting on resumption after a restart, it will know that either this NV-stored target block or the original is a safe starting point for any further update activity, as no modification has yet taken place.

At 318, the target block is read into processor memory (either from its home location, or, if this is a resumption of the update from the first flag state as described above, from the non-volatile store). At 320, the block is modified according to the command in the Type field of the delta from the delta data structure, using the appropriate Length and Value specifications. There are now three versions of the target block: the original at its home location, the NV-stored "save" copy and the in-memory modified copy. A target location is now erased, ready to receive the modified copy at 322, and a second flag is modified to indicate this state at 324. At 326, the modified copy is written to the target location. The bootloader then, at 328, records in non-volatile storage that the data content for the block has been modified and that the process for this delta is complete, and this iteration of the process ends at End 330, which may be the end of the process or a return to start a new iteration of the process for a further delta.

In one variant example, the installation process for a differential update using a delta data structure according to the present technology may work as follows:
1. An update client at the recipient device:
    1.a. Downloads the delta to non-volatile storage;
    1.b. Signals to the bootloader that an update is ready by programming a signal value (which may be, for example, a checksum of the delta or a pending bit at an agreed location); and
    1.c. Triggers a reboot.
2. The bootloader:
2.a. Verifies the delta;
2.b. Composes a sector's write buffer;
2.c. Caches the write buffer to a non-volatile staging region (preferably EEPROM, optionally secure);
2.d. Sets bit 0 of the type to 0 to indicate that the sector has been staged;
2.e. Erases the sector;
2.f Sets bit 1 of the type to 0 to indicate that the sector has been erased;
2.g. Writes the sector to flash;
2.h. Writes NOP;
2.i. Returns to b until no sectors are left; and
2.j. Writes a bit to 0 at the beginning an agreed location or erases the delta-pending bit, indicating that the delta has been applied.

(Note that the 2.c step assumes a trusted buffer, while the rest of the delta does not need to be trusted when used in conjunction with a Message Authentication Code or signature verification technique, such as is known in the art as a means of authenticating a complete stream of data; similarly, nor does any signature information need to be stored in trusted storage, since it can be validated at any time.)

If power is lost or the bootloader is rebooted for any reason, the bootloader:
1. Checks the delta-pending bit to verify whether a delta is in progress.
    1.a. If no delta is in progress, the application is booted.
2. Checks the checksum to see if a delta should be started. (For checksum validation, the flag part of each type byte is masked and replaced by an agreed value like 0)
    2.a. If the checksum is invalid, the application is booted.
3. Scans the delta for the first incomplete status counter.
4. Resumes the delta from the first record where the "Command Done" flag is not set.

Implementations of the present technology thus guard in-place differential data updates in solid-state storage against the difficulties that can be caused by interruptions, such as power failures. In one refinement, the targeted data block, the delta, and the plurality of flags may be copied to trusted storage. When flags are modified during the subsequent processing, they are also updated in the trusted storage. In a variant, a digest (which may be a signed or keyed digest) of the targeted data block, the delta, and the plurality of flags may be saved in trusted storage. In this case, when flags are modified during the subsequent processing, the digest may be recalculated and re-stored in the trusted storage. The targeted data block, the delta, and the plurality of flags, or a digest thereof is thus preserved as a means of trust authentication over any restart that may have interrupted the differential update process.

The implementations above have been discussed in terms of the simplest case, in which a block targeted to be updated by a delta is the same size as a sector of solid-state storage. The process according to the present technology is equally valid in implementations in which the block targeted to be updated by a delta is not the same size as a sector of solid-state storage. If the blocks targeted by the delta commands are smaller than a write sector, they can be treated as a group using the above-described process.

If the blocks targeted by the delta commands are larger than a write sector, two options are possible:
1. If a delta command is non-destructive (that is, it can be repeated without error, then no special considerations are needed, and the delta status is only updated when the whole command has completed. In situations where all commands are non-destructive (where repeating the command will still cause the correct result) the write buffer described above can be omitted.
2. If a delta command is destructive, it requires additional non-volatile status to be retained in the non-volatile write buffer or any other suitable location.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product tangibly embodied in a non-transient computer readable medium having computer readable program code embodied thereon. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A machine-implemented method for transactional modification of content in a solid state storage of a device, comprising:
   receiving a delta data structure comprising at least one delta targeting at least one data block;
   copying a first data block targeted by said at least one delta from said first data block's home location into a non-volatile store;
   modifying a first flag of a plurality of flags stored in said delta data structure following said copying of said first data block;
   reading said first data block into memory;
   modifying said first data block in memory according to said at least one delta to produce a ready-to-write data block;
   erasing a target location;
   modifying a second flag of said plurality of flags stored in said delta data structure following said modifying said first data block and said erasing said target location;
   writing said ready-to-write data block to said target location;
   recording in said delta data structure that said first data block has been modified;
   responsive to a restart of the device following an interruption to said method, testing for existence of said plurality of flags in said delta data structure; and
   responsive to said plurality of flags existing in said delta data structure, scanning said plurality of flags for an unmodified flag and resuming said method from a point corresponding to the unmodified flag.

2. The machine-implemented method of claim 1, wherein said resuming said method is further responsive to determining that a target location is an empty block.

3. The machine-implemented method of claim 1, said delta data structure comprising a command.

4. The machine-implemented method of claim 3 further comprising, after said recording, treating said command as a no-operation command (NOP).

5. The machine-implemented method of claim 4, responsive to said treating said command as a no-operation command (NOP), ignoring said delta data structure and receiving a further delta data structure.

6. The machine-implemented method of claim 1, further comprising after said copying said first data block, storing said first data block, said at least one delta, and said plurality of flags in trusted storage.

7. The machine-implemented method of claim 6, further comprising after each of said modifying said first flag and modifying said second flag, updating said first and second flags of said plurality of flags in said trusted storage.

8. The machine-implemented method of claim 1, further comprising after said copying said first data block, storing a digest calculated from said first data block, said at least one delta, and said plurality of flags in trusted storage.

9. The machine-implemented method of claim 8, further comprising after each of said modifying said first flag and said modifying said second flag, updating said first and second flags of said plurality of flags, calculating a new digest from said first data block, said at least one delta and said updated plurality of flags, and storing said new digest in said trusted storage.

10. The machine-implemented method of claim 8, said digest comprising at least one of a signed digest and a keyed digest.

11. An electronic apparatus for transactional modification of content in a solid state storage of a device, comprising logic operable to perform a method to:
   receive a delta data structure comprising at least one delta targeting at least one data block;
   copy a first data block targeted by said at least one delta from said first data block's home location into a non-volatile store;
   modify a first flag of a plurality of flags stored in said delta data structure following said copying of said first data block;
   read said first data block into memory;
   modify said first data block in memory according to said at least one delta to produce a ready-to-write data block;
   erase a target location;
   write said ready-to-write data block to said target location;

modify a second flag of said plurality of flags stored in said delta data structure following said modifying said first data block and said erasing said target location;

record in said delta data structure that said first data block has been modified;

responsive to a restart of the device following an interruption to said method, test for existence of said plurality of flags in said delta data structure; and responsive to said plurality of flags existing in said delta data structure, scan said plurality of flags for an unmodified flag and resume said method from a point corresponding to the unmodified flag.

12. A non-transitory computer-readable medium having stored thereon instructions that, when executed by a computer, cause the computer to perform a method to:

receive a delta data structure comprising at least one delta targeting at least one data block;

copy a first data block targeted by said at least one delta from said first data block's home location into a non-volatile store;

modify a first flag of a plurality of flags stored in said delta data structure following said copying of said first data block;

read said first data block into memory;

modify said first data block in memory according to said at least one delta to produce a ready-to-write data block;

erase a target location;

modify a second flag of said plurality of flags stored in said delta data structure following said modifying said first data block and said erasing said target location;

write said ready-to-write data block to said target location;

record in said delta data structure that said first data block has been modified;

responsive to a restart of the computer following an interruption to said method, test for existence of said plurality of flags in said delta data structure; and responsive to said plurality of flags existing in said delta data structure, scan said plurality of flags for an unmodified flag and resume said method from a point corresponding to the unmodified flag.

\* \* \* \* \*